(12) United States Patent
Peden et al.

(10) Patent No.: US 10,460,474 B2
(45) Date of Patent: Oct. 29, 2019

(54) DIGITAL SYSTEM AND METHOD FOR PAINT COLOR MATCHING

(71) Applicant: SWIMC LLC, Cleveland, OH (US)

(72) Inventors: Nancy Peden, Garland, TX (US); Isabel Bartig, Long Lake, MN (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/320,273

(22) PCT Filed: Jun. 25, 2015

(86) PCT No.: PCT/US2015/037775
§ 371 (c)(1),
(2) Date: Dec. 19, 2016

(87) PCT Pub. No.: WO2015/200687
PCT Pub. Date: Dec. 30, 2015

(65) Prior Publication Data
US 2017/0213361 A1   Jul. 27, 2017

Related U.S. Application Data

(60) Provisional application No. 62/132,672, filed on Mar. 13, 2015, provisional application No. 62/017,245, filed on Jun. 25, 2014.

(51) Int. Cl.
*G06K 9/00* (2006.01)
*G06T 7/90* (2017.01)
*H04N 1/60* (2006.01)

(52) U.S. Cl.
CPC ............ *G06T 7/90* (2017.01); *H04N 1/6033* (2013.01); *H04N 1/6047* (2013.01);
(Continued)

(58) Field of Classification Search
None
See application file for complete search history.

(56) References Cited

U.S. PATENT DOCUMENTS

| 5,844,542 A | 12/1998 | Inoue et al. |
| 6,502,049 B1 | 12/2002 | Takada et al. |

(Continued)

FOREIGN PATENT DOCUMENTS

| CA | 2584540 A1 | 9/2001 |
| CN | 2340001 Y | 9/1999 |

(Continued)

OTHER PUBLICATIONS

International Search Report and Written Opinion from International Application No. PCT/US2015/037775, dated Nov. 23, 2015, 9 pp.

(Continued)

*Primary Examiner* — Fred H Hu
(74) *Attorney, Agent, or Firm* — Patterson Thuente Pedersen, P.A.

(57) ABSTRACT

A method includes obtaining first color information for each of a plurality of first samples of a first target color with a color measurement device connected to a computing device including a display. A digital color image of at least one first target color is displayed on the display. An offset value for each first target color is determined such that the digital color image of each first target color matches the corresponding first target color on each of the first samples. A second sample including a second target color is scanned to obtain second color information. A processor of the computing device determines, using the offset values of the first target colors, an interpolated offset for the display such that the digital image of the second target color matches the second tar get color.

15 Claims, 20 Drawing Sheets

(52) U.S. Cl.
CPC ......... *H04N 1/6052* (2013.01); *H04N 1/6055* (2013.01); *H04N 1/6083* (2013.01); *G06T 2207/10024* (2013.01)

(56) References Cited

U.S. PATENT DOCUMENTS

| | | | |
|---|---|---|---|
| 6,556,303 B1 | 4/2003 | Rangarajan et al. | |
| 6,641,696 B1 | 11/2003 | Edgerton | |
| 6,717,584 B2 * | 4/2004 | Kulczycka | G06T 15/50 345/589 |
| 6,744,513 B2 | 6/2004 | Kubo et al. | |
| 6,768,814 B1 | 7/2004 | Spitzer et al. | |
| 6,914,613 B2 | 7/2005 | Marchand et al. | |
| 7,042,566 B2 | 5/2006 | Skierski et al. | |
| 7,116,420 B2 | 10/2006 | Skierski et al. | |
| 7,230,707 B2 | 6/2007 | Ingleson et al. | |
| 7,277,202 B2 | 10/2007 | Chan | |
| 7,430,316 B2 * | 9/2008 | Boston | G01J 3/46 382/162 |
| 8,514,470 B2 | 8/2013 | Elliot et al. | |
| 8,526,082 B2 | 9/2013 | Shimizu | |
| 2002/0163640 A1 * | 11/2002 | Masuda | G01J 3/46 356/402 |
| 2003/0151611 A1 | 8/2003 | Turpin et al. | |
| 2004/0078299 A1 * | 4/2004 | Down-Logan | G06Q 30/02 705/26.1 |
| 2004/0093112 A1 | 5/2004 | Marchand et al. | |
| 2004/0104923 A1 | 6/2004 | Koyama | |
| 2004/0131756 A1 | 7/2004 | Skierski et al. | |
| 2004/0223149 A1 | 11/2004 | Skierski et al. | |
| 2006/0152527 A1 * | 7/2006 | Minchew | G01J 3/46 345/593 |
| 2009/0157212 A1 * | 6/2009 | McClanahan | G01J 3/46 700/107 |
| 2010/0214421 A1 * | 8/2010 | Qu | G01J 3/46 348/207.1 |
| 2011/0007372 A1 | 1/2011 | Shimizu | |
| 2012/0147390 A1 | 6/2012 | Elliot et al. | |
| 2013/0176326 A1 * | 7/2013 | Safaee-Rad | G06T 11/001 345/590 |

FOREIGN PATENT DOCUMENTS

| | | |
|---|---|---|
| CN | 1378643 A | 11/2002 |
| CN | 1223176 C | 1/2003 |
| CN | 1492388 A | 4/2004 |
| CN | 1551613 A | 12/2004 |
| CN | 101958991 A | 1/2011 |
| EP | 1 359 399 A2 | 5/2003 |
| FR | 2 698 982 | 6/1994 |
| JP | 11-269411 A | 10/1999 |
| WO | 0128231 A1 | 4/2001 |

OTHER PUBLICATIONS

International Preliminary Report on Patentability from International Application No. PCT/US2015/037775, dated Dec. 27, 2016, 6 pp.
Extended Search Report from counterpart European Application No. 15812046.9, dated Dec. 12, 2017, 9 pp.
Examination Report from counterpart Canadian Application No. 2953500, dated Nov. 28, 2017, 3 pp.
Response to Examination Report dated Nov. 28, 2017, from counterpart Canadian Application No. 2,953,500, filed May 25, 2018, 16 pp.
Examination Report from counterpart Canadian Application No. 2,953,500, dated Oct. 22, 2018, 5 pp.
Response to Communication pursuant to Rules 70(2) and 70a(2) dated Jan. 8, 2018, from counterpart European Application No. 15812046.9, filed Jul. 18, 2018 15 pp.
"Blue Stain", U.S. Department of Agriculture, Forest Service, Forest Products Laboratory, 2 pages, (May 2002).
Lebow, Patricia K., et al., "*Classification of Wood by Spectral Reflectance*", Wood and Fiber Science, vol. 28(1), 17 pages, (Jan. 1996).
International Search Report for PCT/US2006/009845 dated Jul. 27, 2006.

* cited by examiner

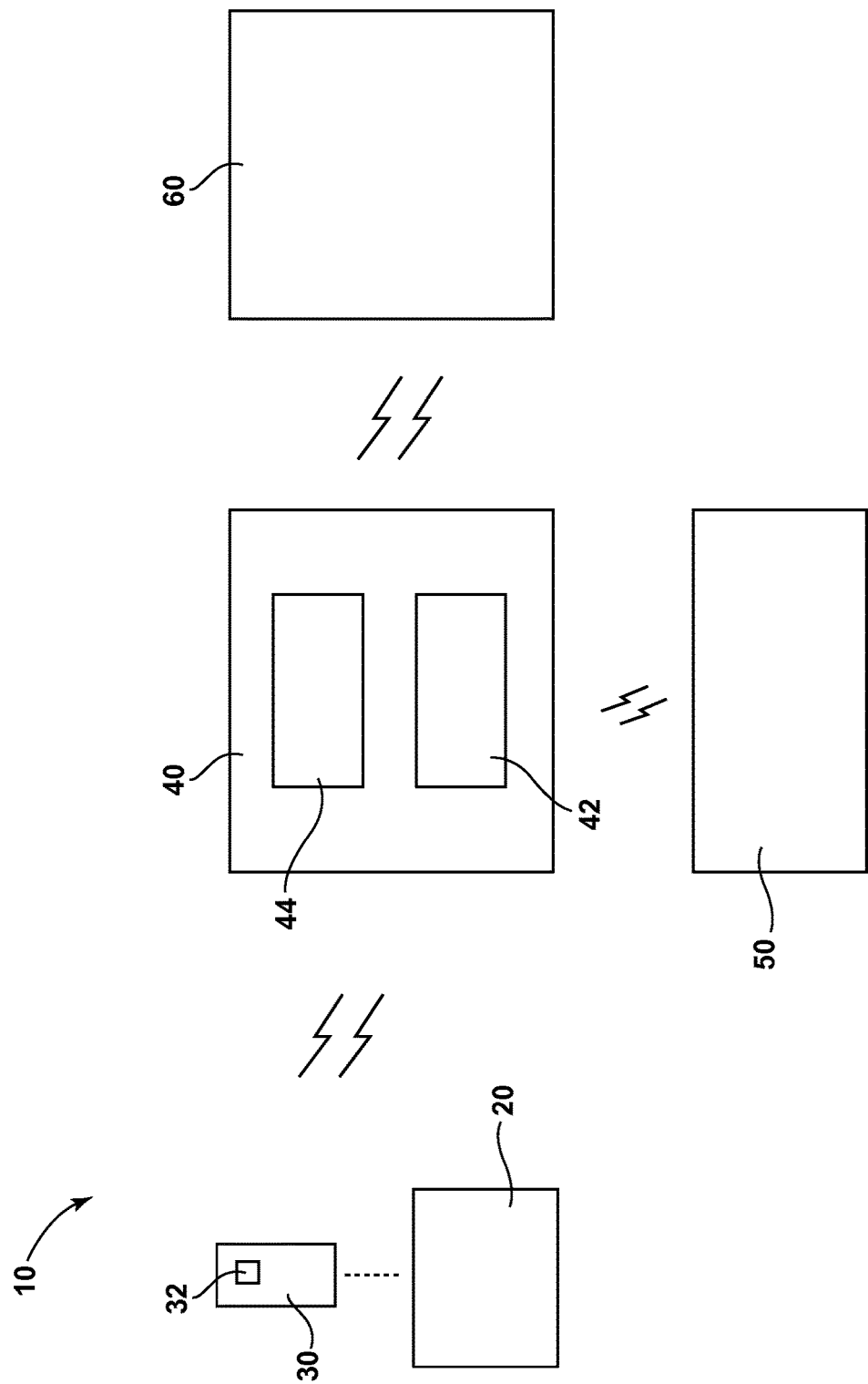

2. Pair NODE
Link your iPad to a NODE.

Enable BLUETOOTH CAPABILITIES on your iPad (device settings).
Ensure the black cap is on your NODE device.
Select device and continue. You will hear a chirp when connected.

OFF / ON      ON / OFF
NOT PAIRED    PAIRED

3. Browse
Explore the color library for inspiration.

DIGITAL SYSTEM AND METHOD FOR PAINT COLOR MATCHING

BACKGROUND

Computerized color matching techniques using spectrophotometers can be used to select a paint for a particular application. In these processes a sample of a target color provided by a customer is measured by a color measurement device to obtain digital color information corresponding to the target color. The digital color information is then compared to paint formulas stored in a database to determine a suitable paint formulation to apply to a substrate to obtain the target color.

SUMMARY

If the digital color information of a target color obtained by a color measurement device is displayed on a display device for approval by a customer, the digital color image of the target color displayed on the display can appear to the customer to be an inaccurate representation of the target color. For example, variations in the digital color image generated by a particular display can cause the displayed digital color information to differ in tint or intensity from the target color observed by the user. These variations between displayed digital colors and actual colors observed by the user can make it difficult for the customer to accurately select a particular paint formulation. In addition, if a paint formula is selected by the customer based on the digital color image on a particular display, the paint formulation can appear to be, based on the customer's perception at the time of purchase, the "wrong" color when later applied to a selected substrate. This can cause the customer to return the paint as an off-shade tint or an erroneous formulation.

In one aspect, the present disclosure is directed to a color correction application run by a computing device. The color calibration and correction tool is configured to adjust the digital image on a color display to accurately and consistently display a target color, which allows users to confidently select a paint color for a particular application.

In one aspect, the present disclosure is directed to a method including:

A) obtaining first color information for each of a plurality of first samples with a color measurement device connected to a computing device comprising a display, wherein the first samples each include a first target color;

B) displaying on the display of the computing device a digital color image of at least one first target color;

C) determining offset values for each first target color such that the digital color image of each first target color matches the corresponding first target color on each of the first samples;

D) scanning a second sample to obtain second color information, wherein the second sample includes a second target color;

E) determining by a processor of the computing device, using the offset values of the first target colors, an interpolated offset for the display such that the digital image of the second target color matches the second target color; and F) displaying on the display a digital color image of the second target color.

In another aspect, the present disclosure is directed to a method including:

A) obtaining first color information for a plurality of samples with a color measurement device wirelessly connected to a computing device including a display, and wherein the each of the plurality of samples comprises a first target color;

B) displaying on the display of the computing device a first digital color image of the each of the first target colors;

C) displaying on the display of the computing device for each first digital color image a second digital color image including second color information, each of the second digital color images differing in tint or intensity from a first digital color image corresponding to a target color, wherein the second color information for each first target color is shifted from the first color information for each first target color by a first offset value;

D) selecting by the user from the first and the second digital color images displayed on the display of the computing device a selected image perceived by the user to most closely correspond to each first target color;

E) determining, using the selected images, offset values for each first target color such that the digital color image of each first target color matches the corresponding first target color on each of the first samples;

F) scanning a third sample to obtain third color information, wherein the third sample includes a third target color;

G) determining by a processor of the computing device, using the offset values of the first target colors, an interpolated offset for the display such that the digital image of the third target color matches the third target color; and H) displaying on the display a digital color image of the third target color.

In yet another embodiment, the present disclosure is directed to a system including a mobile computing device selected from a tablet, a smartphone, a digital watch, or a wearable computing device, wherein the mobile computing device includes a display; a color measurement device connected to the mobile computing device; a color offset value database associated with the mobile electronic device display, wherein the offset value data base stores a color offset value representative of the display, and wherein the color offset value is determined by a processor of the mobile computing device by calculating a series of offset values for each of a plurality of first target colors such that the digital color image of each first target color matches the corresponding first target color on each of a series of first samples.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1 is a schematic block diagram illustrating the components of a color matching system.

FIG. 5 is a screen shot of instructions to assist the user in using the wirelessly connected color measurement device to obtain color information.

FIG. 6-7 are screen shots with instructions for powering on, linking or pairing with the mobile device, and calibrating the color measurement device.

FIG. 8 is a screen shot providing instructions to guide a user in exploring a color library or reviewing previously saved color scans.

FIGS. 15-17 are screen shots with instructions guiding the user in selecting, naming, and storing a scanned color or stock color.

Like symbols in the drawings indicate like elements.

DETAILED DESCRIPTION

Figure 1A:
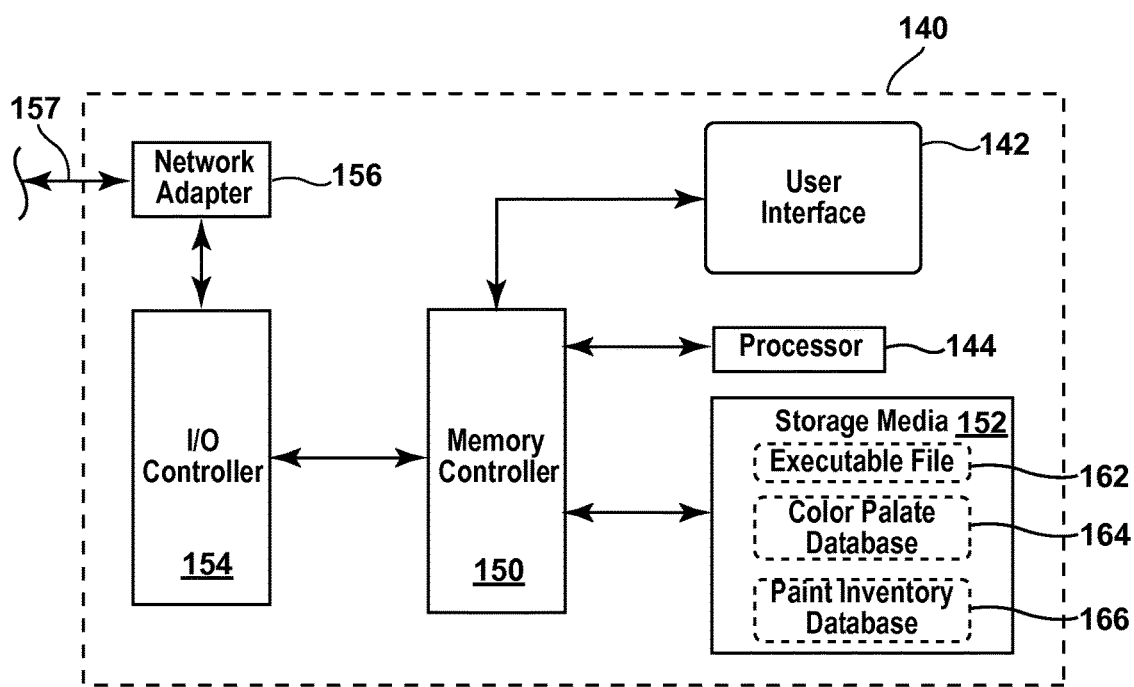
FIG. 1A is a schematic illustration of an example computer architecture for using the color calibration and correction application.

FIG. 1 depicts one possible configuration of a color measurement system that may be used to carry out the color calibration and correction method of the present disclosure. In this depiction, the color measurement system 10 consists of a color measurement device 30 for measuring the color of a region of a sample 20, a computing device 40 (which is, in some embodiments, a mobile computing device), and an optional tinting machine 60. A suitable color measurement device 30 may include cameras, scanners, or spectrophotometers, or combinations thereof.

In various embodiments, the color measurement and correction system 10 includes a spectrophotometer that is part of the mobile computing device 40 or is wirelessly linked to the computing device 40 by a communication system such as, for example, a network interface card, an Ethernet card, an optical transceiver, a radio frequency transceiver, or any other type of device that can send and receive information. Other examples of such communication systems may include, but are not limited to, Bluetooth, 4G, 3G, near field communication (NFC), and Wi-Fi radios, Universal Serial Bus (USB) interfaces, etc.

In one embodiment, the spectrophotometer is also a portable device such as those available from Variableinc, Chattanooga, Tenn., under the trade designation NODE. The NODE is a modular device that can be configured with a wide variety of detachable sensor elements for color measurement including, for example, a spectrophotometer, a bar code scanner, a light meter, and the like. The NODE device transmits digital color information about the sample 20 wirelessly through Bluetooth 2.1 or 4.0 up to 250 feet away to an iOS (Apple) or Android smart mobile computing device 40. Each NODE device also has an internal memory port 32 allowing for data to be stored and then uploaded to any computer or mobile computing device.

In one embodiment, the NODE+ sensor platform, combined with the Chroma 2.1 color sensor (the NODE) is a Bluetooth Low Energy (BLE) peripheral which can scan an item it is placed on, calculate the CIELAB value of the color of the scanned item, and then communicate that result over BLE. CIE 1976 color space (CIELAB) values are a perceptually uniform extension of the abstract XYZ color space, which represents colors in a way similar to how the colors are represented by the human eye.

A color space is perceptually uniform if a change in a value representing a color would result in a similar change in the visual intensity of the color itself. Perceptual uniformity can simplify the determination of how similar and how different two colors are. A CIELAB color value has three parts: L*, which denotes how light or dark the color is, a*, which denotes how much green or magenta a color has, and b*, which denotes how much blue or yellow a color has.

All CIELAB values specify an illuminant, which is type of light that is hitting the sample being measured. In this application the CIELAB values utilize a D65 illuminant, which closely corresponds to bright noon day sunshine. D65 refers to an illuminant that has a color temperature of approximately 6500 k.

As illustrated, the mobile computing device 40 includes a processor 42 and a user input device such as, for example, a color display 44. In various embodiments, the computing device 40 may include any number of different portable electronic computing devices, but not limited to, smart watches, smart glasses, headsets, mobile phones (including smartphones), laptop and tablet computers, cameras, personal digital assistants (PDAs), etc. The computing device 40 may include various input and output components, including, e.g. one or more processors, memory, telemetry modules, cellular network antennas, a display, one or more UI elements, sensors, and a power source like a rechargeable battery. One or more application processors may implement functionality and/or execute instructions within the computing device 40. These instructions executed by application processors may cause the computing device 40 to read/write/ etc. information during program execution. Examples of one or more of application processors used in the computing device 40 may include one or more microprocessors, digital signal processors (DSPs), application specific integrated circuits (ASICs), field programmable gate arrays (FPGAs), or any other equivalent integrated or discrete logic circuitry, as well as any combinations of such components.

FIG. 1A illustrates an example computer architecture for utilizing the color correction application of the present disclosure. In this embodiment, a color correction application is run on a computer 140, which may be one or more personal computers, laptop computers, server systems, and/ or portable media devices such as a smart phone, portable media player, personal digital assistant (PDA), tablet device, and the like. However, the color correction application may alternatively be utilized with a variety of different computer architectures. For example, the color correction application may be stored on one or more servers (e.g., cloud servers), and accessed over the Internet or other network connections by multiple remote computer devices. Accordingly, the term "computer system", with reference to computer applications of the color calibration and correction tool of the present disclosure may include any suitable computer architecture of one or more computer devices.

In the embodiment shown in FIG. 1A, the computer 140 may include a user interface 142, a memory controller 150, a processor 144, storage media 152, input/output (I/O) controller 154, and network adapter 156. The computer 140 may also include a variety of additional components that are contained in conventional computers, servers, and/or media devices.

The user interface 142 is a user-operated interface (e.g., keyboards, touch pads, touchscreen displays, and other eye, voice, or hand-operated controls) configured to operate computer 140 and run the color correction application. The memory controller 150 is a circuit assembly that interfaces the components of the computer 140 with one or more volatile random access memory (RAM) modules of storage media 152. The processor 144 is one or more computer-processing units configured to operate the computer 140, and optionally, with memory controller 150, may perform all of the functions for running the color correction application.

The storage media 152 is one or more internal and/or external data storage devices or computer storage media for computer 140, such as volatile RAM modules, read-only memory modules, optical media, magnetic media (e.g., hard disc drives), solid-state media (e.g., FLASH memory and solid-state drives), analog media, and the like. Storage media 152 may retain an executable copy of the color correction application, referred to as stored executable file 162, as well as color palette database 164 and paint inventory database 166. Alternatively, color palette database 164 and/or paint inventory database 166 may be located on one or more remote computer devices (e.g., a cloud server), or may be incorporated into stored executable file 162 of the color correction application.

The I/O controller 154 is a circuit assembly that interfaces memory controller 150, processor 144, and storage media 152 with various input and output components of computer 140, including network adapter 156. The network adapter 156 is one or more wired or wireless transmitter/receiver adapters configured to communicate over a network line 157. For example, network adapter 156 may be a direct local area network or internet connection adapter, a cellular wide area network transmitter/receiver, a Wi-Fi local area network transmitter/receiver, or combinations thereof.

Referring again to FIG. 1, the computing device 40 may be configured to access a storage device 50 housing database records of paint formulations, colors and the like. In addition, the computing device 40 may be a networked device linked to a database of paint formulations and colors. In various embodiments, the storage device 50 can include a wide variety of databases, including databases of color information obtained from paint formula books, previously saved customer paint formulations, or color fan decks obtained from various manufacturers.

Any suitable tinting machine 60 may be utilized that is capable of delivering known quantities of various ingredients. Preferred systems are in communication with the computing device 40 and the storage device 50, but "stand-alone" systems and "manual" systems may also be used. In such instances the desired paint formula information obtained from the data storage device 50 and output from the computing device 40 is used to produce a desired paint color.

When the target color obtained by scanning the sample or obtained by selecting a stock color from a fan deck, color book or catalogue is displayed on the display 42 of the computing device 40 as a digital color image, the customer can perceive the digital color image to have a slightly different color from the target color of the sample or fan deck. This slight difference in tint or intensity, or both can cause the customer to select an incorrect paint formulation, or can cause the customer discomfort in even making a paint formulation selection. These differences can result from variations in displays, which can be difficult or inconvenient for the customer to adjust for accurate color matching.

The present disclosure is directed to display-specific color correction methods and applications to ensure that the digital color image of a target color on the display 44 of the mobile computing device 40 accurately represents a target color measured by a color measurement device.

Figure 2:
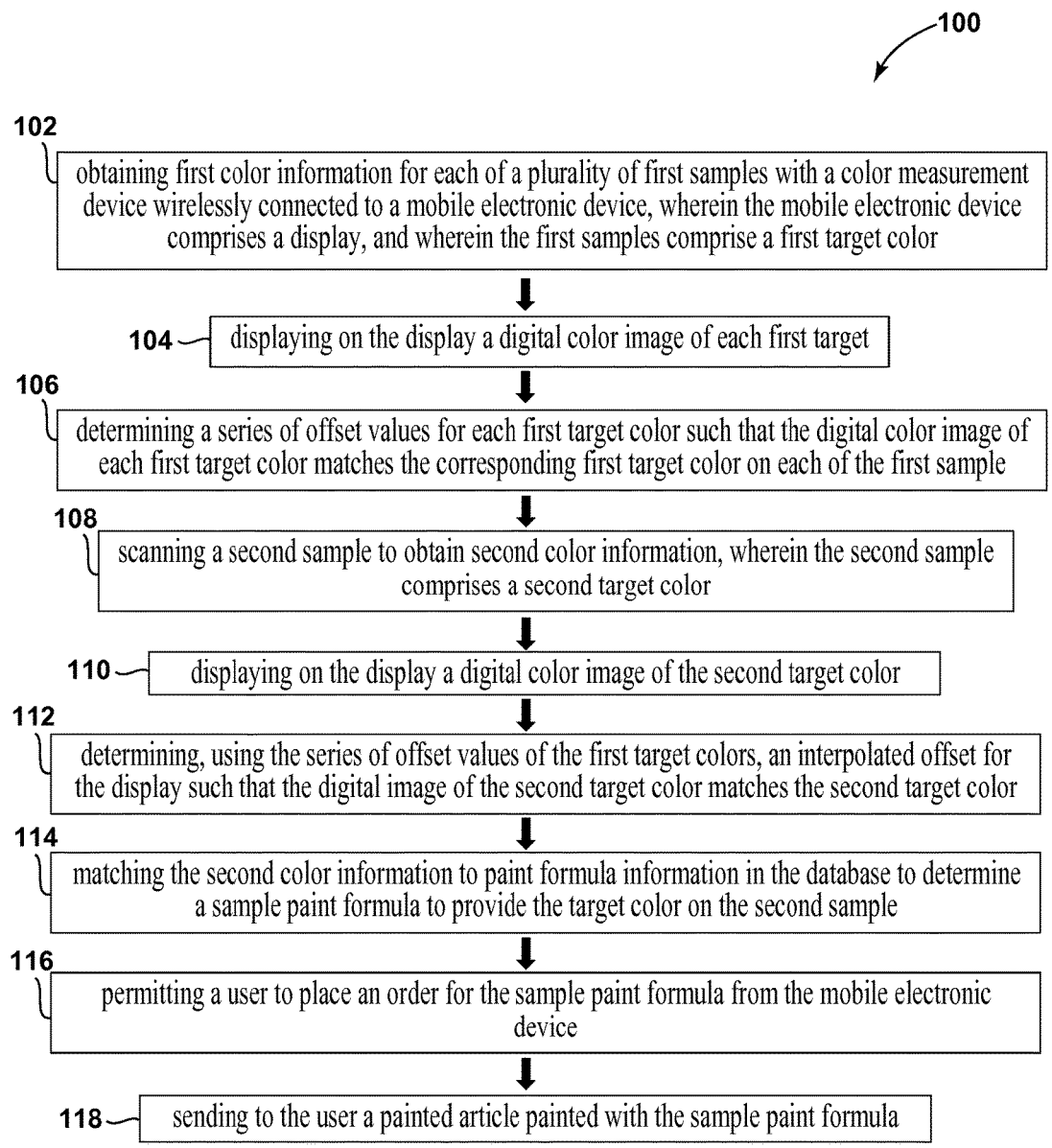
FIGS. 2-3 are flow charts of methods for calculating an offset value for displayed digital color images.

In one embodiment shown in FIG. 2, a method 100 includes a step 102 of obtaining color information for a sample with a color measurement device associated with a mobile computing device including a display. The sample has a target color. In some embodiments, the samples are primary colors such as, for example, red, green, blue, yellow, purple, black and white. In some embodiments, the samples are of a known color. In various embodiments, the samples can be solid colors, metallic colors, and combinations thereof.

In step 104, a series of offset values for the target color are determined to adjust the digital color image of the target color on the display 42 to match the corresponding target color on the sample.

In one embodiment, for example, the offset values can be determined converting the CIELAB values obtained by the color measurement device for the sample to digital red/green/blue (RGB) values. The RGB color space is a color space used by commercially available mobile devices such as the iPad for displaying colors to a viewer.

For example, the RGB values can be used to adjust the appearance of the target color on a selected display under indoor lighting conditions. Since indoor lighting usually ranges from a color temperature of about 2800 k to about 4500 k, about 3400 k is a common approximation for the color temperature of indoor lighting. In one embodiment, the RGB values calculated from the CIELAB values obtained from the color measurement device are adjusted for color accuracy on a selected mobile device display using software packages such as, for example, those available under the trade designation Capture One from Phase One USA, Melville, N.Y., by comparing the digital image on the display to the physical display panel under 3400K lighting.

In various embodiments, to obtain suitably accurate color adjustments the mobile device display was viewed at an angle of about 65°, away from natural sunlight, at a mobile device brightness of 100%, although a wide variety of viewing conditions could potentially be used.

The adjusted RGB values of the target color are then used to determine an offset value for the selected display for each target color. The corrected RGB colors were determined and stored in a database so that a selected mobile device display (for example, an iPad) displaying the corrected sRGB color would display a color on the screen that is the most perceptually similar to a physical sample of the target color being illuminated by a 3400 k light source.

In step 106, using the offset color values, the digital color image of the target color of the sample is displayed on the display of the mobile device, and the digital color image of the target color matches the corresponding target color on the sample.

In optional step 108, a second sample is scanned with the color measurement device to obtain second color information, wherein the second sample is of a second target color. In step 112, using the series of offset RGB values of the first target colors, an interpolated offset for the display for a particular mobile device is calculated by the processor of the computing device such that the digital image of the second target color on the screen of the mobile device matches the second target color (110). For example, if the second color is orange, the processor in the computing device can utilize the offset values for red and yellow to determine a suitable offset for orange. The more samples of the first target color are analyzed, the greater the system's ability to generate more accurate interpolated or extrapolated offset values for various colors.

In another example embodiment, a color correction algorithm may be used by the processor of the computing device to calculate the ΔE distance between the CIELAB value of a scanned target color, and the CIELAB value of every other color in a paint color library. Δe (deltaE) is a measurement of the perceptual distance between two colors in the CIELAB color space. The smaller the deltaE value between two colors, the closer they are together. A ΔE of 1.0 is usually the smallest perceivable difference between two colors. There are several standards for calculating ΔE, and in one example embodiment, which is not intended to be limiting, the color correction algorithm uses de2000, which varies the weighting of L* depending on where in the lightness range the color falls.

In one embodiment, the color calibration and correction application running on the processor of the computing device selects a plurality (for example, 3, 5, 10, 50 or 100) of closest colors in the color library with the smallest ΔE values relative to the scanned target color. The closest colors are the most perceptually similar to the scanned target color, and in some embodiments the digital color images of the closest colors in the color library are displayed adjacent to the scanned target color.

In one embodiment, a color correction application running on the processor of the computing device loops through each of the plurality of closest colors and, for each closest color:

a. If ΔE between the scanned CIELAB color and the closest color is less than ε (0.000001), set ΔE to ε.
b. Create a weight for each color to indicate how much this color should affect the correction of the scanned color. The weight is calculated using the formula 1/ΔE.
c. Calculate an uncorrected sRGB color from the original CIELAB scan of the closest color. The algorithm now has the uncorrected RGB color and the hand corrected RGB color for the closest color.
d. Create a correction factor for each red, green, and blue display component of the closest color. The correction factors are in the form:

i. $Cf_r = \frac{\text{hand-corrected red}}{\text{uncorrected red}}$ ii. $Cf_g = \frac{\text{hand-corrected green}}{\text{uncorrected green}}$ iii. $Cf_b = \frac{\text{hand-corrected blue}}{\text{uncorrected blue}}$ e. Each correction factor is multiplied by the weight determined in step b.
f. The red correction factor ($Cf_r$) is added to a running total of all red correction factors. The same is done with the green and blue correction factors.
g. The weight calculated in step b is added to a total of all weights.

The total of all red correction factors is divided by the total of all weights. This gives the weighted average of the red correction factor.

The weighted average is determined in the same way with the green and blue color components.

The weighted average of the red correction factor is multiplied with the uncorrected red component of the scanned color. This creates a corrected red component for the scanned color.

The same process is used by the processor of the computing device to create corrected green and blue components for the scanned color.

The corrected red, green, and blue components of the scanned second target color are combined by the processor of the computing device into a RGB color, which is then displayed on the screen of the mobile device.

In an optional step, the color measurement device may be calibrated prior to scanning the first target color samples to obtaining the first color information.

In step 114, if the computing device 40 is connected to a database of paint formula information, in some embodiments the method further optionally includes matching the target color information to paint formula information in the database 50 to determine a sample paint formula to provide the target color on the sample. In various embodiments, the sample paint formula is selected from a compilation of stock formulas, a record of formulas previously prepared for a user, or a fan deck of colors.

In step 116, the method can further include the optional step of permitting a user to place an order for the sample paint formula from the computing device.

In step 118, the method can further include the optional step of sending to the user a painted article painted with the sample paint formula.

Figure 3:
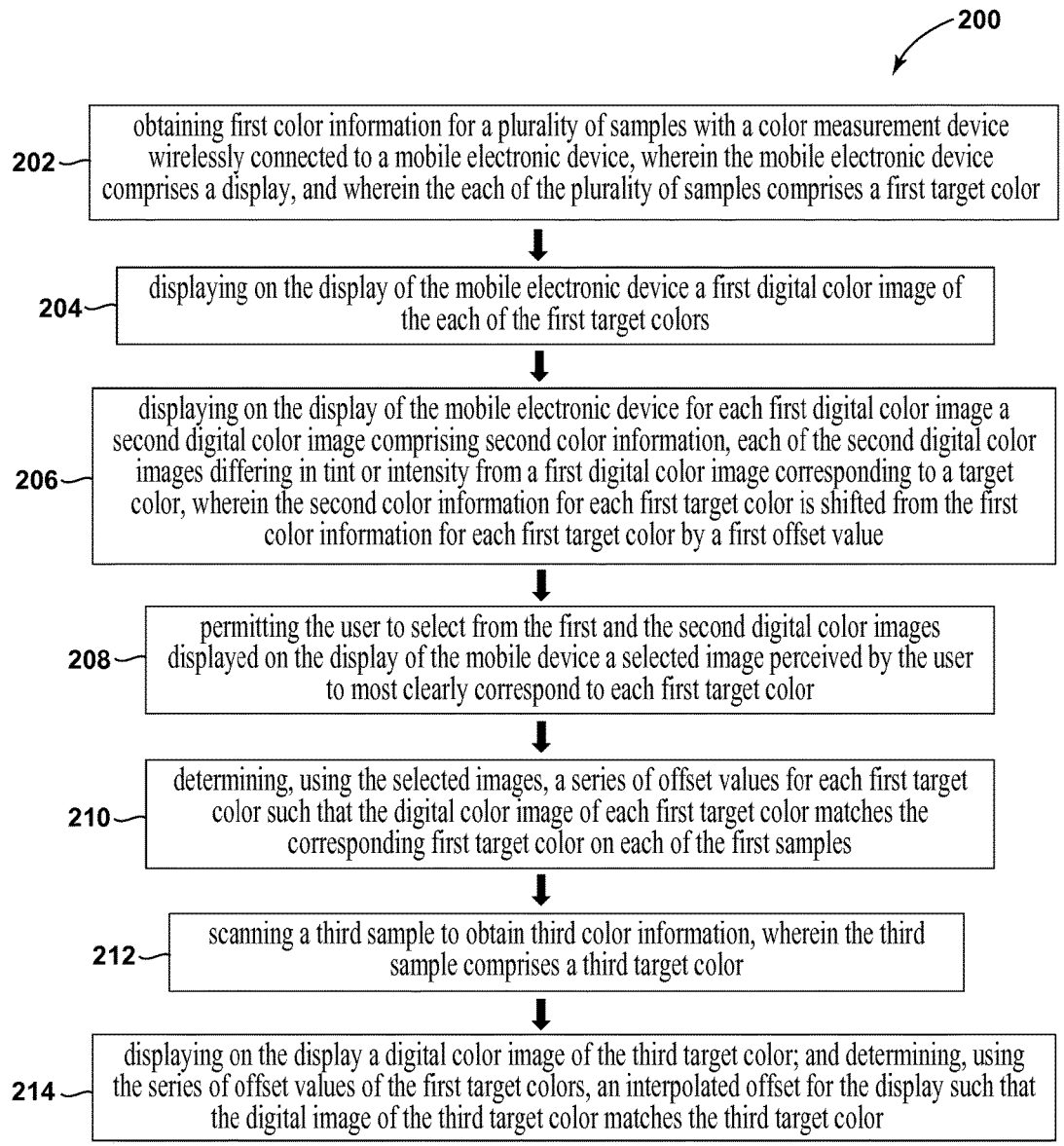

In another embodiment of the method 200 shown in FIG. 3, in step 202 first color information is obtained for a plurality of samples with a color measurement device wirelessly connected to a mobile computing device including a display, wherein the each of the plurality of samples includes a first target color.

In step 204, a first digital color image of the each of the first target colors is displayed on the display of the mobile computing device.

In step 206, for each first digital color image, one or more second digital color images including second color information is displayed by the mobile computing device on the display, each of the second digital color images differing in tint or intensity from a first digital color image corresponding to a target color, wherein the second color information for each first target color is shifted from the first color information for each first target color by a first offset value. In various embodiments, the second color information differs in tint or intensity from the first color information by at least about 1ΔE, or at least 2ΔE, or at least 5ΔE.

In step 208, a user is permitted to select from the first and the second digital color images displayed on the display of the computing device a selected image perceived by the user to most closely correspond to each first target color. In some embodiments, the user could be allowed to select on the screen the most accurate digital color images that correspond to each first target color.

In step 210, using the selected images, a series of offset values is determined for each first target color such that the digital color image of each first target color matches the corresponding first target color on each of the first samples In step 212, a third sample is scanned to obtain third color information, wherein the third sample includes a third target color, and in step 214 a digital color image of the third target color is displayed on the display.

In step 214, using the series of offset values of the first and second target colors, an offset for the display is determined by the processor of the computing device using the color correction application above such that the digital image of the third target color matches the third target color.

In yet another embodiment, a user can scan an object and view an accurate color representation of the object displayed by applying the color offset values determined by processor of the computing device using the algorithm above. The user can save the color, order a display panel painted with the color, or view similar colors from the paint color library.

As noted above, the system can be configured to permit the manipulation of database and/or target color images. In one embodiment, the computing device displays a side-by-side comparison of the target panel image next to a database image. The user is then able to scroll through various database images to find the best "match." In another embodiment, the computing device is configured to display an array of database images, graduated pixels, or a scroll bar to adjust colors surrounding the target panel image. The user can use the visual clues of the array to better steer through the array and find the closest "match."

In yet another embodiment, the computing device provides "tools" to enable the user to find other suitable database images. For example, a side-by-side display of the target panel image and a database image might be presented on the display. Tools that permit the user to find other images (e.g., lighter-darker; more red-less red, more green-less green, etc.) are included. The system may also provide a content library including, but not limited to, videos, presentations, case studies and product literature.

In yet another embodiment, the computing device is configured so that more than one database image may be selected as "matches." For example, the user may decide that the best color is somewhere between two displayed database images. The sample color information may be matched by the computing device with paint formula information in the database 50 to determine a sample paint formula to provide the sample color. The paint formula may be provided either as a printout or supplied as directions to an associated tinting machine 60 (FIG. 1), or a painted sample may be provided to the customer.

Figure 4A:
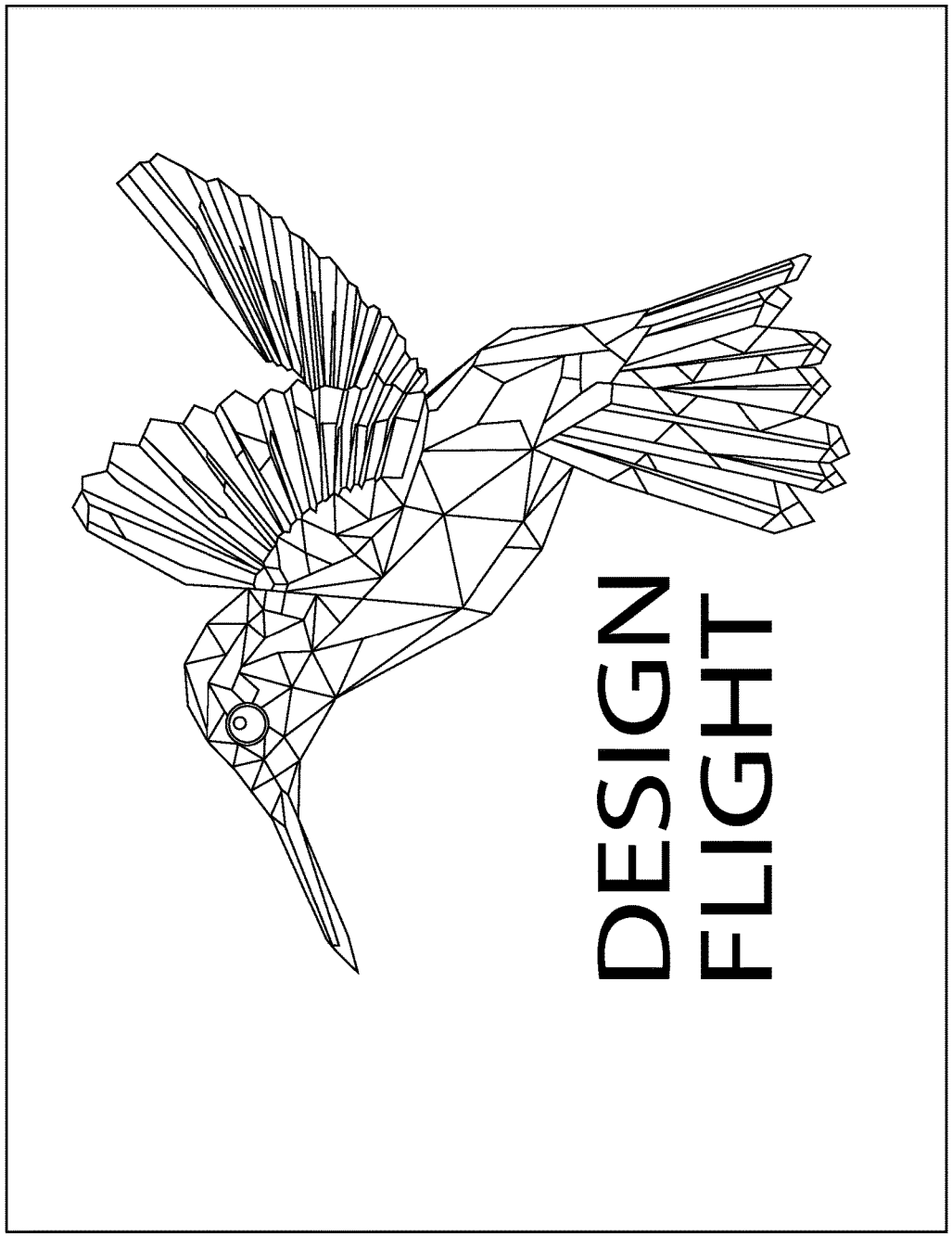
FIG. 4A is a screen shot of an embodiment of an icon that can be tapped by a user to activate a color matching system.
Figure 4B:
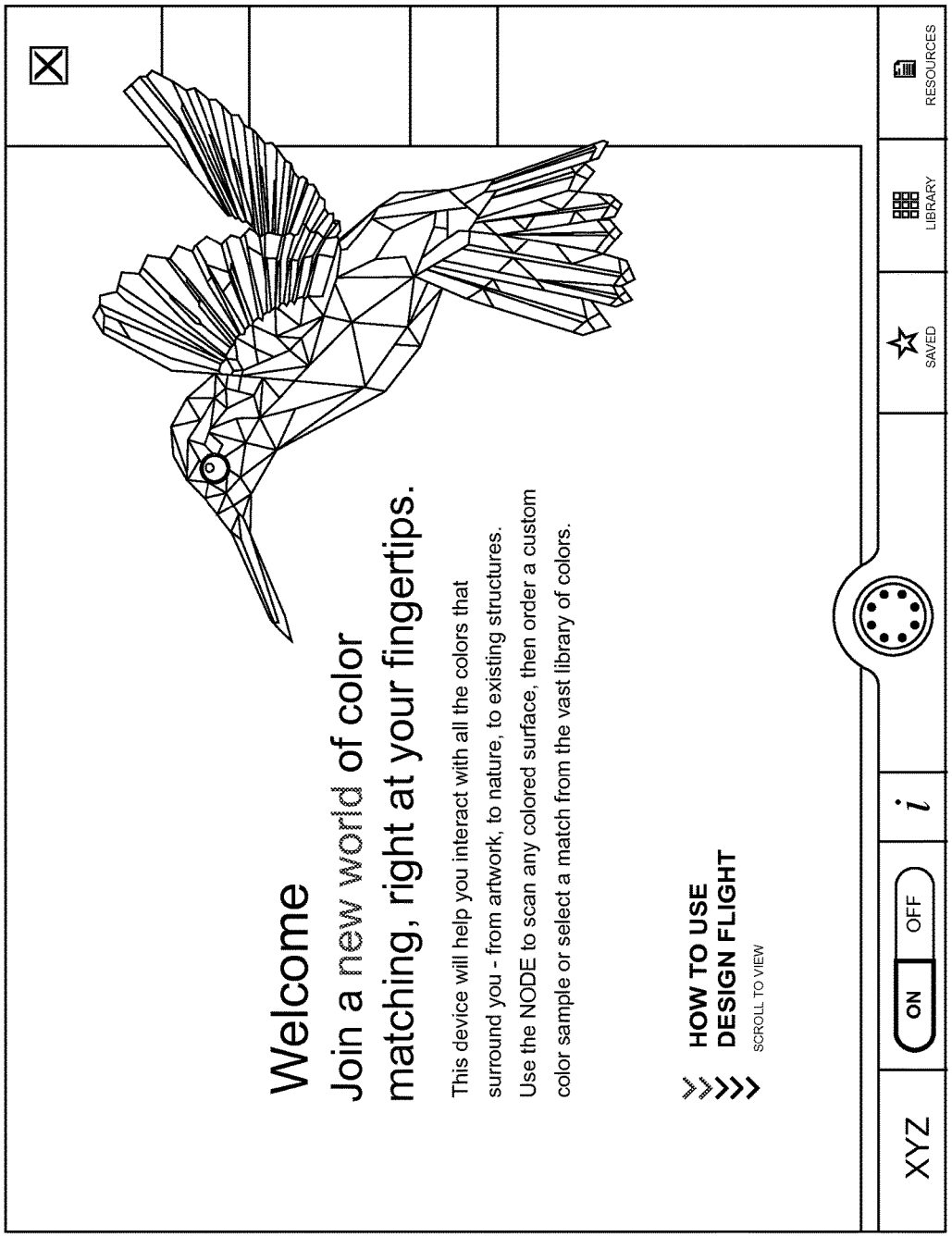
FIG. 4B is a screen shot of a display that can be activated by a user to access a color matching system.

In one example embodiment of the color correction application that is not intended to be limiting, once an appropriate icon on the display of the mobile device, such as a "Design Flight" icon in FIG. 4A or display illustrated in FIG. 4B is selected by a user, the mobile device begins running the "Design Flight" application, which includes the color correction application described above.

Figure 5:
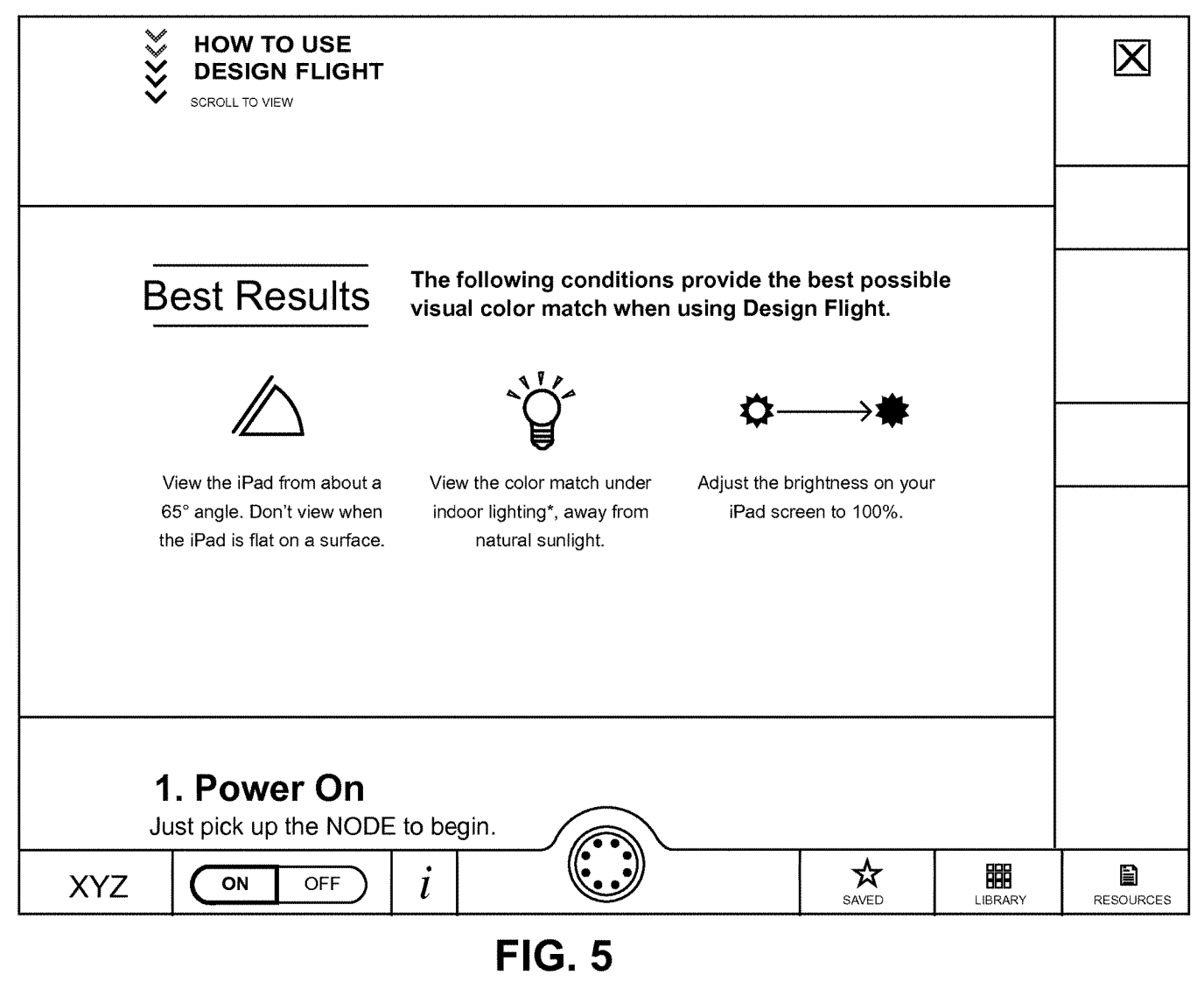

As shown in FIG. 5, the Design Flight application includes instructions to assist the user in employing the wirelessly connected NODE spectrophotometer device to obtain color information from any colored surface and create an accurate visual color match from an existing formulation or with a custom formulation.

Figure 6:
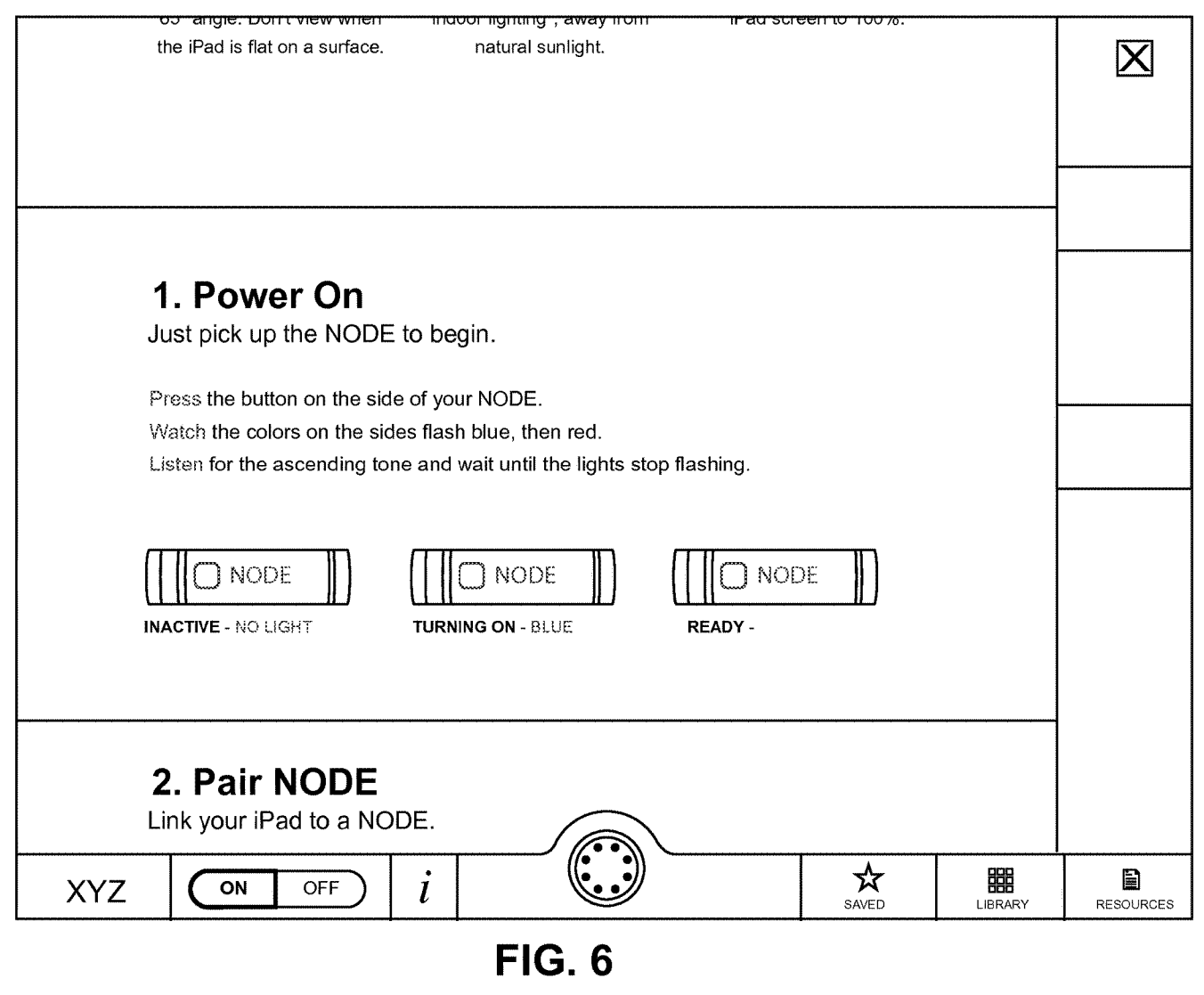

Referring to FIGS. 6-7, the NODE spectrophotometer device can be powered on, linked or paired with the mobile device.

Figure 8:
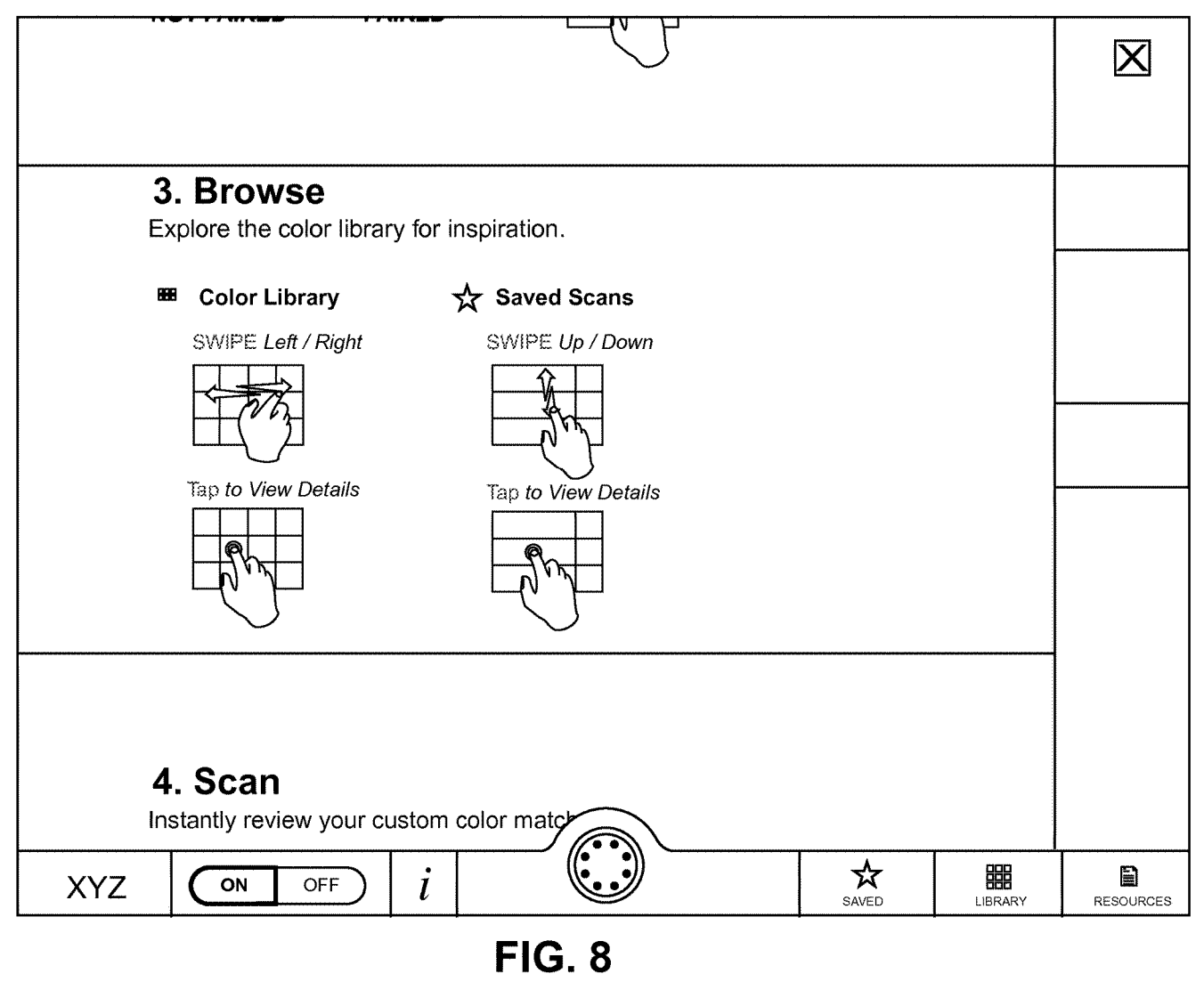

As shown in FIG. 8, the user may browse a color library stored in or linked to the data storage device 50, or may review previously saved scans stored therein. The color library contains a plurality of colors from various manufacturers and many hundreds or thousands of colors. The user would optionally need to scan their colors with their node device and thereby facilitate custom color lookup. The user may swipe left or right to view the colors and previously saved scans, and may tap to select a color.

Figure 9:
FIG. 9 is a screen shot providing a user with instructions for scanning a sample with the color measurement device, while FIG. 10 provides the user with instructions for saving the scanned color information, and FIG. 11 provides the user with ordering information to obtain the scanned color.
Figure 10:
Figure 11:
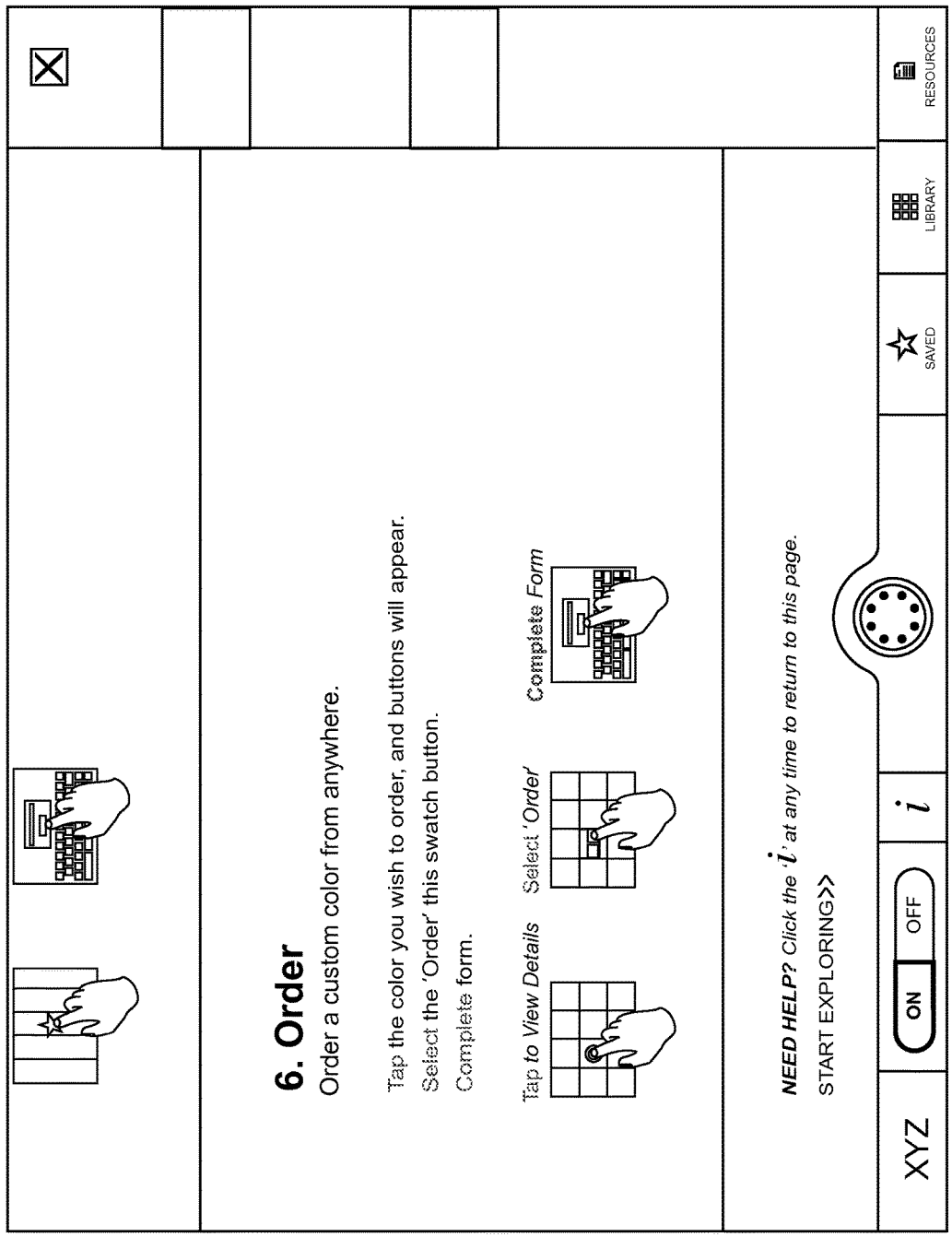

Referring to FIG. 9, if a color match to a particular customer-provided or customer approved sample is desired, the user may scan a surface of the sample using the NODE spectrophotometer device. In various embodiments, to obtain the most appropriate regions of the target panel image, the user may be guided to select the appropriate region, or filters may be applied to the entire image to assist or direct that process. For example, in one embodiment, the target panel image is displayed on the display of the computing device and the user is permitted to select those pixels that he or she would like to match. Alternatively, the computing device can highlight the best regions and get confirmation of this selection from the user. The custom color match may be viewed by the customer and saved as shown in FIG. 10, and the customer may order custom colors as shown in FIG. 11.

Figure 12:
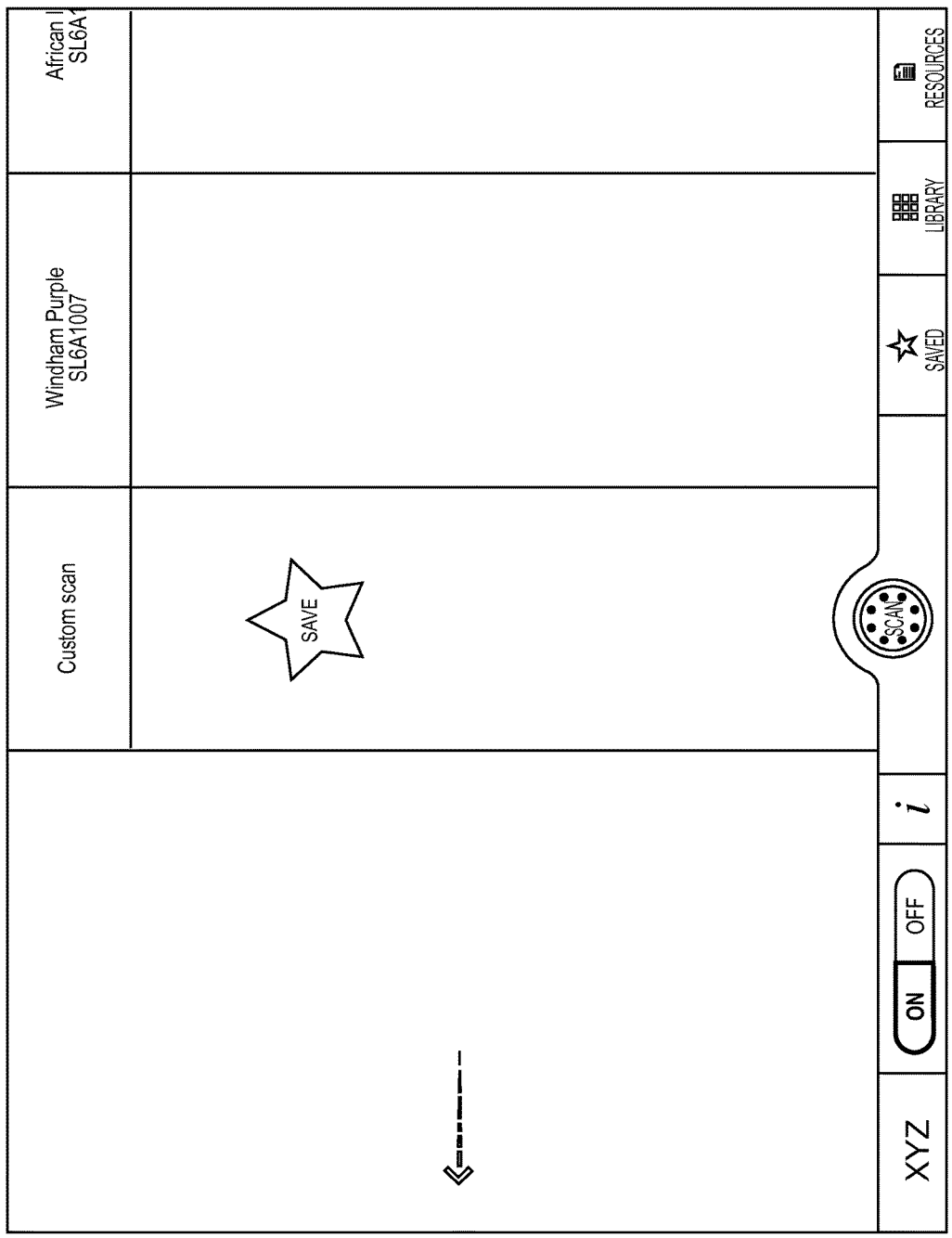
FIGS. 12-13 are screen shots of digital color images obtained by scanning or sample or selecting a color from the color library.
Figure 13:
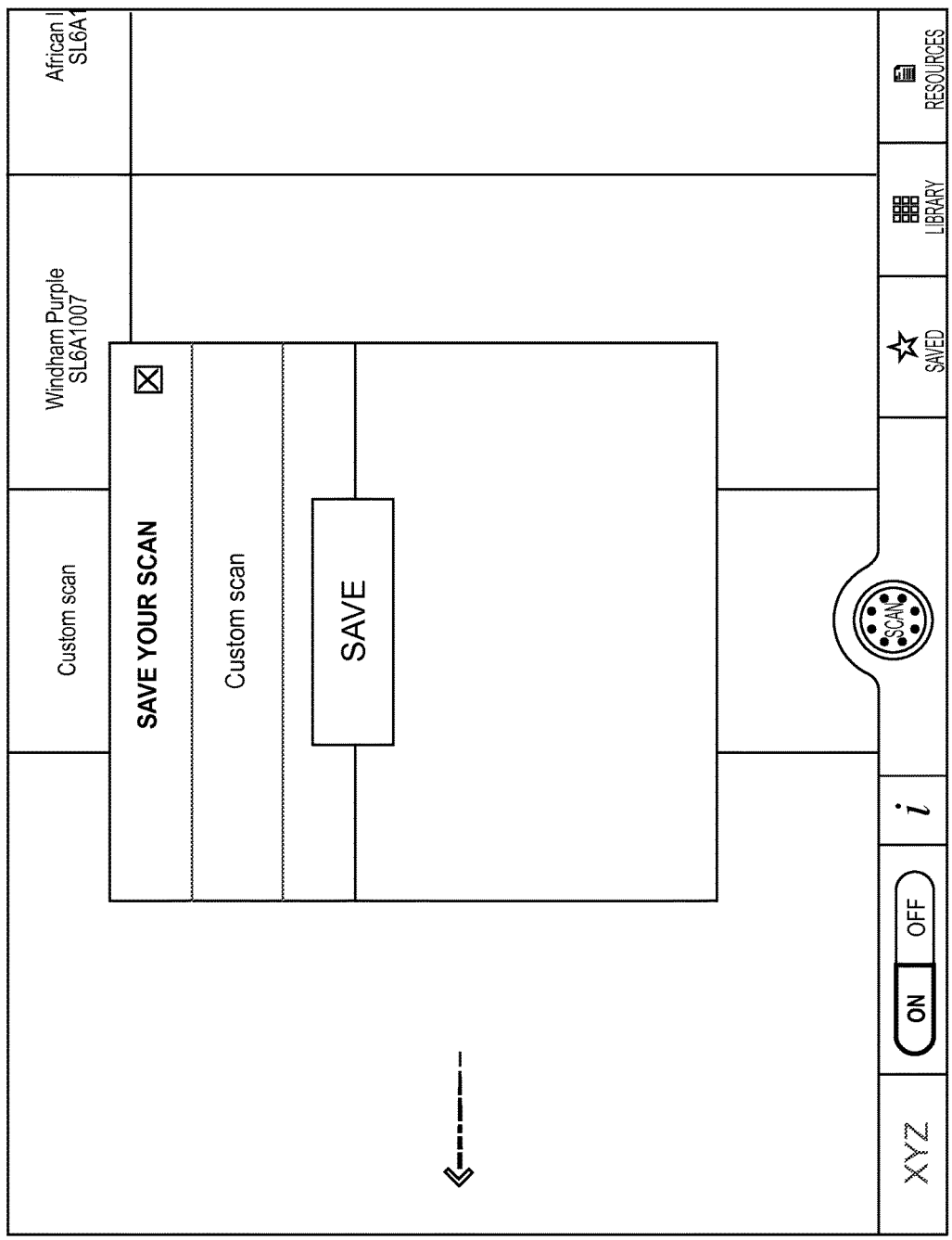

As shown in FIGS. 12-13, in one embodiment the color display of the computing device can display a digital color image determined using the color correction application described above, and the digital color image obtained from the scan of the sample will be displayed adjacent to digital images of similarly tinted colors from the color library stored in the database 50 (FIG. 1). The customer can save the scanned or selected color, or an order form may be displayed so the customer can order a paint of the selected color.

Figure 14:
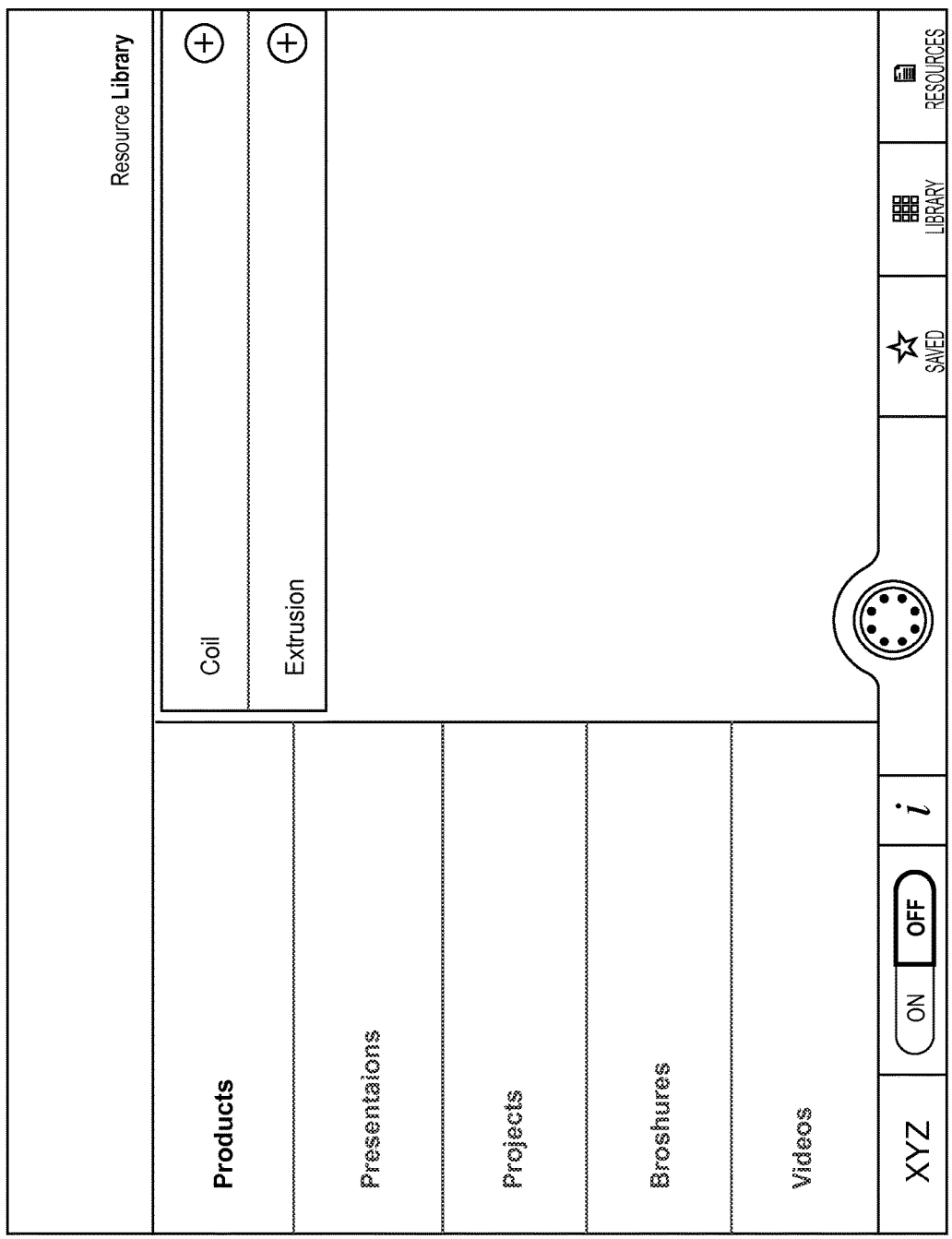
FIG. 14 is a screen shot of tools that may be accessed to assist the user in selecting a color from the color library or to provide the user with information on how to utilize the selected color in a painting project.

Referring to FIG. 14, the customer may optionally tap an appropriate bar to select tools or other information to assist in the color selection process. Suitable tools include, for example, information on paint products, presentations on how to apply paints, decorating tips and the like, sample project ideas, brochures, and video presentations.

Figure 15:
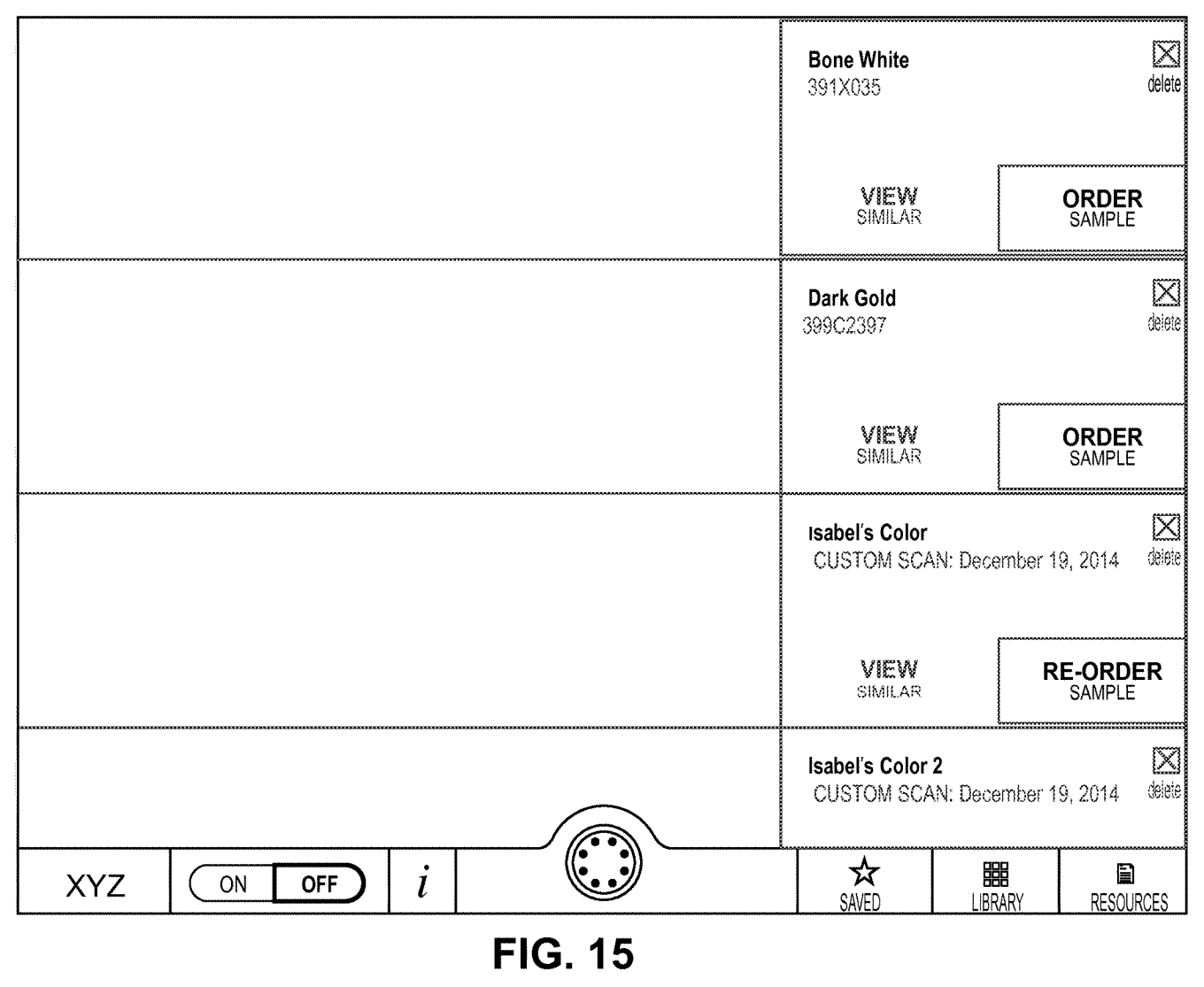
Figure 16:
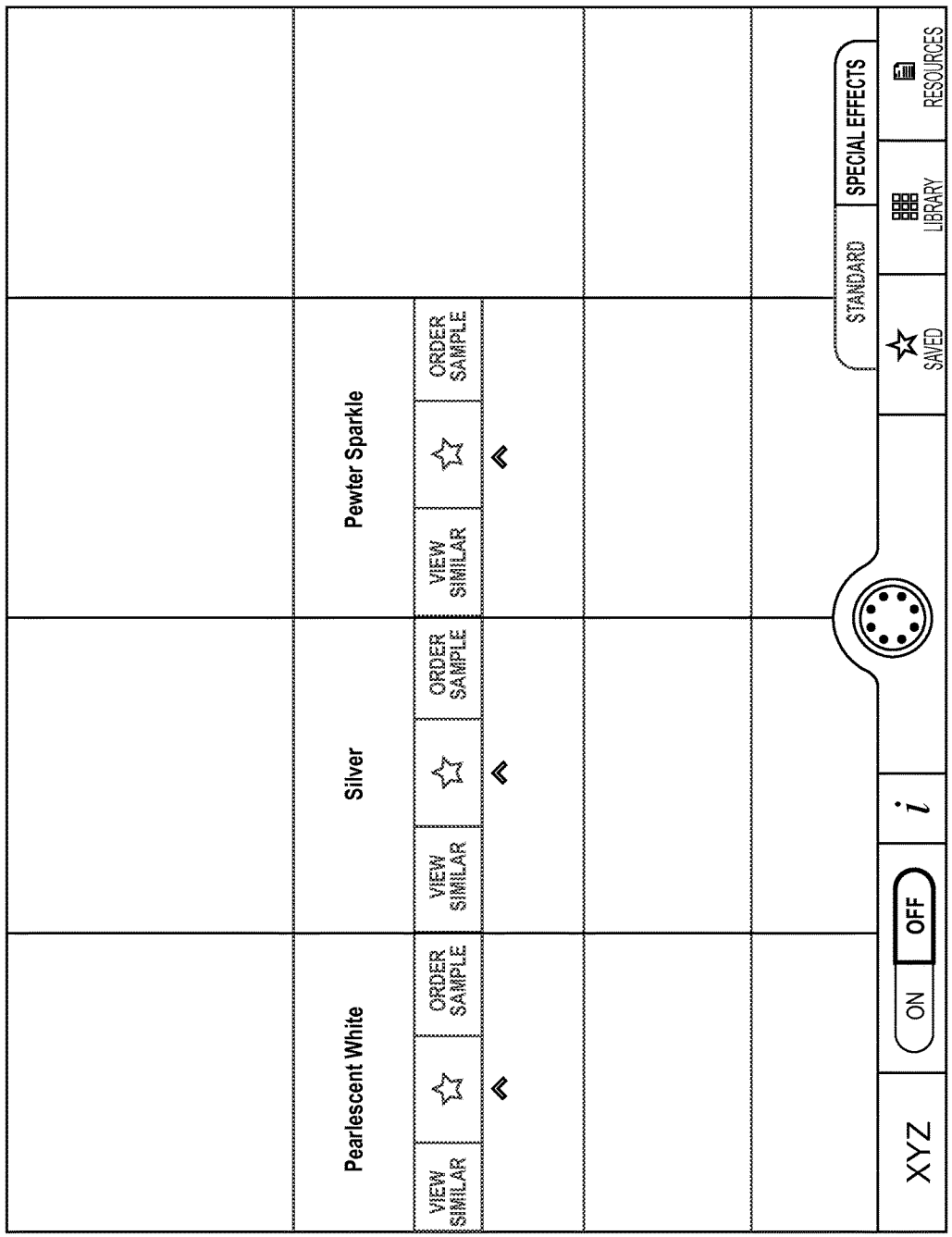
Figure 17:
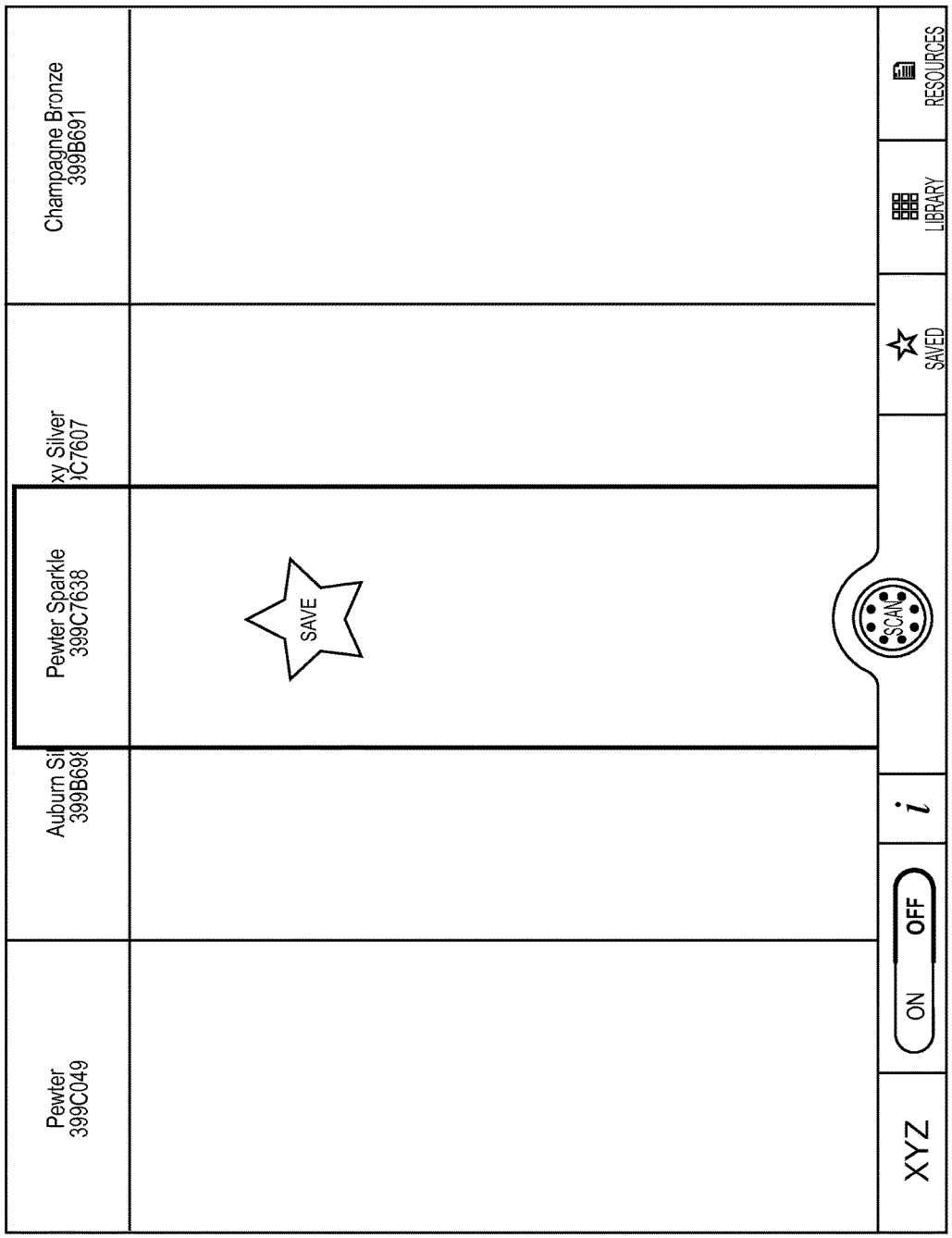
Figure 18:
FIG. 18 is a screen shot with instructions guiding a customer in ordering a sample of a selected color.

As shown in FIGS. 15-17, the customer may scan a sample and the scanned color may be displayed adjacent to solid or metallic colors obtained from a paint color library. As shown in FIG. 18, the customer may then save the scan of the sample and/or order a paint with the appropriate color.

Embodiment 1

A method, comprising: A) obtaining first color information for each of a plurality of first samples with a color measurement device wirelessly connected to a computing device comprising a display, wherein the first samples each comprise a first target color; B) displaying on the display of the computing device a digital color image of at least one first target color, C) determining an offset value for each first target color such that the digital color image of each first target color matches the corresponding first target color on each of the first samples; D) scanning a second sample to obtain second color information, wherein the second sample comprises a second target color; E) determining by a processor of the computing device, using the offset values of the first target colors, an interpolated offset for the display such that the digital image of the second target color matches the second target color, and F) displaying on the display a digital color image of the second target color.

Embodiment 2

The method of embodiment 1, wherein the first samples each comprise known color information.

Embodiment 3

The method of embodiments 1 or 2, further comprising calibrating the color measurement device prior to obtaining the first color information.

Embodiment 4

The method of any of embodiments 1 to 3, wherein the computing device is associated with a database of paint formula information, the method further comprising matching the second color information to paint formula information in the database to determine a sample paint formula to provide the target color on the second sample.

Embodiment 5

The method of embodiment 4, wherein the sample paint formula is selected from a compilation of stock formulas, a record of formulas previously prepared for a user, or a fan deck of colors.

Embodiment 6

The method of embodiment 4, further comprising permitting the user to place an order for the sample paint formula from the computing device.

Embodiment 7

The method of embodiment 6, further comprising sending to the user a painted article painted with the sample paint formula.

Embodiment 8

The method of any of embodiments 1 to 7, wherein the computing device is selected from a tablet, a smartphone, a digital watch, or a wearable device.

Embodiment 9

The method of any of embodiments 1 to 8, wherein the color measurement device comprises a spectrophotometer.

Embodiment 10

A method, comprising the steps of: A) obtaining first color information for a plurality of samples with a color measurement device wirelessly connected to a computing device comprising a display, and wherein the each of the plurality of samples comprises a first target color, B) displaying on the display of the computing device a first digital color image of the each of the first target colors; C) displaying on the display of the computing device for each first digital color image a second digital color image comprising second color information, each of the second digital color images differing in tint or intensity from a first digital color image corresponding to a target color, wherein the second color information for each first target color is shifted from the first color information for each first target color by a first offset value; D) selecting by the user from the first and the second digital color images displayed on the display of the computing device a selected image perceived by the user to most closely correspond to each first target color; E) determining, using the selected images, offset values for each first target color such that the digital color image of each first target color matches the corresponding first target color on each of the first samples; F) scanning a third sample to obtain third color information, wherein the third sample comprises a third target color; G) determining by a processor of the computing device, using the offset values of the first target colors, an interpolated offset for the display such that the digital image of the third target color matches the third target color; and H) displaying on the display a digital color image of the third target color.

Embodiment 11

The method of embodiment 10, further comprising calibrating the color measurement device prior to obtaining the first color information.

Embodiment 12

The method of any of embodiments 10 to 11, wherein the computing device is selected from a tablet, a smartphone, a digital watch, or a wearable device.

Embodiment 13

The method of any of embodiments 10 to 12, wherein the color measurement device comprises a spectrophotometer.

Embodiment 14

The method of any of embodiments 10 to 13, wherein the computing device is connected to a database of paint formula information, the method further comprising matching the third color information to the paint formula information to determine a sample paint formula to provide the color of the third sample.

Embodiment 15

The method of embodiment 14, wherein the sample paint formula is selected from a compilation of stock formulas, a record of formulas previously prepared for the user, or a fan deck of colors.

Embodiment 16

The method of embodiment 14, further comprising permitting the user to place an order for the sample paint formula from the computing device.

Embodiment 17

A system, comprising: a mobile electronic device selected from a tablet, a smartphone, a digital watch, or a wearable computing device, wherein the mobile electronic device comprises a display; a color measurement device connected to the mobile electronic device; a color offset value database associated with the mobile electronic device display, wherein the offset value data base stores a color offset value representative of the display, and wherein the color offset value is determined by a processor of the mobile electronic device by calculating a series of offset values for each of a plurality of first target colors such that the digital color image of each first target color matches the corresponding first target color on each of a series of first samples.

Embodiment 18

The system of embodiment 17, further comprising a database of paint formula information associated with the mobile electronic device.

Embodiment 19

The system of any of embodiments 17 to 18, further comprising a database of ordering information associated with the mobile electronic device.

Embodiment 20

The system of any of embodiments 17 to 19, further comprising a device for dispensing colorants or vehicles to create a sample color.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Various embodiments of the invention have been described. These and other embodiments are within the scope of the following claims.

The invention claimed is:

1. A method, comprising:
   obtaining first color information for each of a plurality of first paint samples with a spectrophotometer connected to a computing device comprising a display, wherein the first paint samples each comprise a first target color, and wherein the computing device is connected to a database of paint formula information;
   displaying on the display of the computing device a digital color image of at least one first target color;
   receiving, by the computing device, a user selected adjustment to the displayed digital color image of each first target color such that the displayed digital color image of each first target color matches the corresponding first target color for each of the first paint samples;
   determining, by the computing device and based on the user selected adjustment, an offset value for each first target color, wherein the offset value corresponds to an adjustment that changes the displayed digital color image of each first target color to match the corresponding first target color for each of the first paint samples;
   obtaining second color information of a second paint sample, wherein the second paint sample comprises a second target color;
   determining by a processor of the computing device, using the offset values of the first target colors, an interpolated offset for the display such that a displayed digital color image of the second target color matches the second target color, wherein determining the interpolated offset for the display comprises:
   selecting a plurality of closest colors from a color library that are closest to the second color information;
   for each of the selected plurality of closest colors, calculating a correction factor for each of the red, green and blue display components;
   determining a weighted average of the correction factors calculated for the red display components of the selected plurality of closest colors;
   determining a weighted average of the correction factors calculated for the green display components of the selected plurality of closest colors;
   determining a weighted average of the correction factors calculated for the blue display components of the selected plurality of closest colors;
   displaying on the display the digital color image of the second target color based on the interpolated offset; and
   matching the second color information to paint formula information in the database to determine a paint formula corresponding to the second target color on the second paint sample.

2. The method of claim 1, wherein the first paint samples each comprise known color information.

3. The method of claim 1, further comprising calibrating the spectrophotometer prior to obtaining the first color information.

4. The method of claim 1, wherein the sample paint formula is selected from a compilation of stock formulas, a record of formulas previously prepared for a user, or a fan deck of colors.

5. The method of claim 1, further comprising ordering the sample paint formula from the computing device.

6. The method of claim 5, further comprising sending to the user a painted article painted with the sample paint formula.

7. The method of claim 1, wherein the computing device is selected from a tablet, a smartphone, a digital watch, or a wearable device.

8. A method, comprising the steps of:
obtaining first color information for a plurality of first paint samples with a spectrophotometer connected to a computing device comprising a display, and wherein the each of the plurality of first paint samples comprises a first target color, and wherein the computing device is connected to a database of paint formula information;
displaying on the display of the computing device a first digital color image of the each of the first target colors;
displaying on the display of the computing device for each first digital color image a second digital color image comprising second color information, each of the second digital color images differing in tint or intensity from the first digital color image corresponding to the first target colors, wherein the second color information is shifted from the first color information for each first target color by a first offset value;
receiving a selected image from the first and the second digital color images displayed on the display of the computing device perceived by a user to most closely correspond to each first target color,
determining, using the selected image, offset values for each first target color, wherein the offset values correspond to an adjustment that changes the digital color image of each first target color to match the corresponding first target color for each of the first paint samples;
obtaining third color information of a third paint sample, wherein the third paint sample comprises a third target color,
determining by a processor of the computing device, using the offset values of the first target colors, an interpolated offset for the display such that a displayed digital color image of the third target color matches the third target color, wherein determining the interpolated offset for the display comprises:
selecting a plurality of closest colors from a color library that are closest to the third color information;
for each of the selected plurality of closest colors, calculating a correction factor for each of the red, green and blue display components;
determining a weighted average of the correction factors calculated for the red display components of the selected plurality of closest colors;
determining a weighted average of the correction factors calculated for the green display components of the selected plurality of closest colors;
determining a weighted average of the correction factors calculated for the blue display components of the selected plurality of closest colors;
displaying on the display the digital color image of the third target color based on the interpolated offset; and
matching the third color information to paint formula information in the paint formula database to determine a paint formula corresponding to the third target color of the third paint sample.

9. The method of claim 8, further comprising calibrating the spectrophotometer prior to obtaining the first color information.

10. The method of claim 8, wherein the computing device is selected from a tablet, a smartphone, a digital watch, or a wearable device.

11. The method of claim 8, wherein the sample paint formula is selected from a compilation of stock formulas, a record of formulas previously prepared for the user, or a fan deck of colors.

12. The method of claim 8, further comprising ordering the sample paint formula from the computing device.

13. A system, comprising:
a mobile electronic device selected from a tablet, a smartphone, a digital watch, or a wearable computing device, wherein the mobile electronic device comprises a display, and wherein the mobile electronic device is connected to a database of paint formula information;
a spectrophotometer connected to the mobile electronic device;
a color offset value database associated with the mobile electronic device display, wherein the color offset value database stores a color offset value representative of the display, and wherein the color offset value is determined by a processor of the mobile electronic device by calculating a color offset value for each of a plurality of first target colors, wherein the color offset value corresponds to an adjustment that changes a displayed digital color image of each first target color to match the corresponding first target color for each of a series of first paint samples; and
wherein the mobile electronic device is connected to a database of paint formula information,
wherein the mobile electronic device is further configured to:
receive second color information from the spectrophotometer obtained from a scan of a second target color;
determine, using the offset values for one or more of the plurality of first target colors, an interpolated offset for the display such that a displayed digital color image of the second target color matches the second target color, the mobile electronic device further configured to:
select a plurality of closest colors from a color library that are closest to the second color information;
for each of the selected plurality of closest colors, calculate a correction factor for each of the red, green and blue display components;
determine a weighted average of the correction factors calculated for the red display components of the selected plurality of closest colors;
determine a weighted average of the correction factors calculated for the green display components of the selected plurality of closest colors;
determine a weighted average of the correction factors calculated for the blue display components of the selected plurality of closest colors;
display the digital color image of the second target color based on the interpolated offset; and
match the second color information to paint formula information in the database to determine a paint formula corresponding to the displayed digital color image of the second target color.

14. The system of claim 13, further comprising a database of ordering information associated with the mobile electronic device.

15. The system of claim 13, further comprising a device for dispensing colorants or vehicles to create a sample color.

* * * * *